United States Patent
Grosse et al.

(10) Patent No.: US 12,392,422 B2
(45) Date of Patent: Aug. 19, 2025

(54) VALVE HAVING A POSITION SENSING MEANS

(71) Applicant: Buerkert Werke Gmbh & Co. KG, Ingelfingen (DE)

(72) Inventors: Kersten Grosse, Ingelfingen (DE); Michael Tischmacher, Ingelfingen (DE); Sagar Agarwal, Ingelfingen (DE); Marc Cöster, Ingelfingen (DE); Martin Luschtinetz, Ingelfingen (DE)

(73) Assignee: BUERKERT WERKE GMBH & CO. KG (DE)

( * ) Notice: Subject to any disclaimer, the term of this patent is extended or adjusted under 35 U.S.C. 154(b) by 0 days.

(21) Appl. No.: 17/865,251

(22) Filed: Jul. 14, 2022

(65) Prior Publication Data
US 2023/0013016 A1  Jan. 19, 2023

(30) Foreign Application Priority Data
Jul. 15, 2021 (DE) ...................... 10 2021 118 302.2

(51) Int. Cl.
*F16K 37/00* (2006.01)
(52) U.S. Cl.
CPC ................................. *F16K 37/0033* (2013.01)
(58) Field of Classification Search
CPC .................................................. F16K 37/0033
See application file for complete search history.

(56) References Cited

U.S. PATENT DOCUMENTS

| 6,097,183 A | 8/2000 | Goetz et al. | |
|---|---|---|---|
| 9,982,988 B2 | 5/2018 | Schaaf | |
| 2002/0167306 A1 * | 11/2002 | Zalunardo | G01D 5/145 324/207.2 |
| 2004/0211928 A1 * | 10/2004 | Coura | F16K 1/446 251/129.04 |
| 2006/0164074 A1 * | 7/2006 | Andrieu | G01D 5/145 324/207.13 |

(Continued)

FOREIGN PATENT DOCUMENTS

| DE | 69903277 T2 | 6/2003 |
|---|---|---|
| DE | 102012205903 A1 | 10/2013 |

(Continued)

*Primary Examiner* — Angelisa L. Hicks
(74) *Attorney, Agent, or Firm* — Dilworth IP, LLC

(57) ABSTRACT

A valve has a position sensing mechanism including at least one Hall sensor and a signal transmitter, wherein the Hall sensor senses magnetic field components in a first measuring direction and in a second measuring direction orthogonal thereto, wherein the two measuring directions are arranged in a planar measurement zone of the Hall sensor. The signal transmitter is an axially polarized magnet which is arranged on a valve tappet linearly displaceable along an axis of movement such that the poles thereof lie in the axis, wherein the axis runs parallel to the first measuring direction and at a distance from the measurement zone along a surface normal of the measurement zone. An imaginary centerline is defined on the measurement zone through a center of the measurement zone and along the first measuring direction, wherein the axis is arranged at a distance from the imaginary centerline along the second measuring direction.

10 Claims, 3 Drawing Sheets

(56) References Cited

U.S. PATENT DOCUMENTS

| | | | |
|---|---|---|---|
| 2013/0027028 A1* | 1/2013 | Hohe | G01D 5/145 |
| | | | 324/207.11 |
| 2013/0066587 A1 | 3/2013 | Kalathil et al. | |
| 2014/0096850 A1* | 4/2014 | Filkovski | F16K 37/0041 |
| | | | 137/554 |
| 2015/0081246 A1 | 3/2015 | Schaaf | |

FOREIGN PATENT DOCUMENTS

| | | |
|---|---|---|
| DE | 102018203884 A1 | 9/2019 |
| JP | 5875947 B2 * | 3/2016 |

\* cited by examiner

VALVE HAVING A POSITION SENSING MEANS

FIELD OF THE INVENTION

The invention relates to a valve having a position sensing means.

BACKGROUND

To sense the position of a valve element and thus determine the state of the valve with respect to an open or closed position, it is known to arrange a magnet as a signal transmitter on a linearly movable valve tappet connected to the valve element, which moves in the sensing range of a Hall sensor. The measurement signal generated in this way in the Hall sensor is used to determine the position.

The signal strength of the measurement signal varies greatly with the distance at which the magnet passes the Hall sensor, so that the smallest possible distance is normally selected to obtain the highest possible signal amplitude. Therefore, the Hall sensor is usually positioned as close as possible to the magnet, and the measurement zone thereof is aligned centrally to the axis of movement of the magnet so that a surface normal extending from a centerline of the measurement zone intersects the axis of movement.

In the case of Hall sensors which measure a movement in three spatial directions perpendicular to each other, an axial movement of an axially polarized magnet in such an arrangement results in a measurement signal for the direction of movement (hereinafter also referred to as the x direction) and in a measurement signal for the direction from the magnet to the Hall sensor along the surface normal of the measurement zone (hereinafter also referred to as the z direction). Due to the course of the magnetic field lines, no or only a very small signal is measured for the third spatial direction, which is perpendicular to the first measuring direction in the plane of the measurement zone (also referred to as the y direction in the following).

To evaluate the measurement signals, it is known, for example, from DE 10 2018 203 884 A1 to form the quotient of the two measurement signals obtained and to apply a sigmoid function, for example an arctangent function, to this result for linearization.

Due to the manufacturing process, the properties of the partial sensors for the individual spatial directions, such as sensitivity, offset and drift, vary in the case of Hall sensors integrated in semiconductor chips. Here, the x and y partial sensors arranged on the surface of the Hall sensor have similar properties, while the properties of the z partial sensor directed into the depth of the Hall sensor differ to a greater extent.

Thus, when using the measurement signals of the x and z partial sensors, all sensor properties must be taken into account upon evaluation, which requires complex calculations or error corrections.

The object of the invention is to improve the position sensing in a valve.

SUMMARY

The improvement comprises a valve having a position sensing means comprising at least one Hall sensor and a signal transmitter, wherein the Hall sensor is structured so as to comprise at least two partial sensors which sense magnetic field components in a first measuring direction and in a second measuring direction orthogonal thereto, wherein the two measuring directions lie in a planar measurement zone of the Hall sensor. In the plane of the measurement zone, an extension of the Hall sensor in the two measuring directions is greater than an extension of the Hall sensor perpendicular thereto. The signal transmitter is an axially polarized magnet which is arranged on a valve tappet linearly displaceable along an axis of movement such that the poles thereof lie in the axis of movement, wherein the axis of movement runs parallel to the first measuring direction and at a distance from the measurement zone along a surface normal of the measurement zone. An imaginary centerline is defined on the measurement zone through a center of the measurement zone and along the first measuring direction, wherein the axis of movement is arranged at a distance from the imaginary centerline along the second measuring direction.

Thus, as in the known arrangement, the axis of movement is placed in front of the measurement zone at a (small) distance in the z direction (i.e., perpendicular to the plane spanned by the two measuring directions), but is additionally also offset along the second measuring direction with respect to the imaginary centerline of the measurement zone, which forms the axis of symmetry of the y partial sensor. Thus, the y partial sensor also senses a component of the magnetic field of the signal transmitter and provides a sufficiently large signal. This allows to use the values of the x partial sensor and the y partial sensor for the calculation of the measurement signal, which are both arranged in the planar measurement zone and have similar sensor characteristics.

Thus, the advantage is achieved that when forming a quotient of the measurement signals, identical sensor errors are shortened out and similar sensor errors are at least reduced, which simplifies the evaluation.

In the arrangement described above, the first measuring direction corresponds to the x direction, while the second measuring direction corresponds to the y direction.

The measurement zone represents the active measuring range of the Hall sensor and is usually significantly smaller than the housing dimensions of the Hall sensor. This measurement zone is known for each sensor and is clearly apparent for a person skilled in the art on the Hall sensor itself or from a manufacturer's documentation for this Hall sensor, to enable a positionally accurate installation of the Hall sensor. For example, in known Hall sensors, a center of the measurement zone is indicated with dimensions of the measurement zone and the orientation of the measuring directions.

Suitable for implementing the invention are Hall sensors which are designed to be mounted on a circuit board and which usually have contacts arranged on both sides of the surface defined by the measurement zone, so that the measurement zone is parallel to an upper side of the Hall sensor and parallel to the circuit board.

As the axis of movement is positioned in front of the surface of the measurement zone of the Hall sensor in the z direction, the circuit board on which the Hall sensor is arranged can be mounted on a housing wall, which enables a compact arrangement.

The distance of the axis of movement from the imaginary centerline may be selected at the discretion of a person skilled in the art. It should be noted here that the distance should be chosen so large that a measurement signal of the y partial sensor assigned to the second measuring direction is obtained which can be used for practical purposes. With increasing distance, the signal strength of the y component initially increases, as the y component of the magnetic field of the signal transmitter is increasingly sensed, until the signal strength decreases again after exceeding a maximum due to the general distance dependence. However, the signal strength of the x component decreases as the distance increases as soon as the axis of movement and the imaginary centerline are no longer congruent. Within this usable distance, a person skilled in the art can freely select the position of the axis of movement.

It has proven to be a well-suited arrangement to select the offset of the axis of movement relative to the imaginary centerline along the second measuring direction so large that in a projection along the surface normal of the measurement zone, the axis of movement does not overlap with the imaginary centerline and optionally not with the measurement zone.

Optionally, the offset of the axis of movement with respect to the imaginary centerline along the second measuring direction is selected to be a factor of 0.3 to 0.5 of a diameter of the signal transmitter perpendicular to the axis of movement.

For example, with a diameter of the signal transmitter of 19 mm and a height of 5 mm, the offset from the imaginary centerline can be 5 mm to 8 mm. Here, a measurement zone having a diameter of 1 mm along the second measuring direction was assumed. The offset of the axis of movement in the z direction may be, for example, 10 mm.

The axis of movement can be arranged at a distance from the imaginary centerline such that the signal strengths in the first and second measuring directions are of the same order of magnitude in terms of value. For example, the ratio of the differences between the minimum and maximum values for the measurement signals resulting from the first and second measuring directions when the signal transmitter moves away over the entire range of movement thereof may be between 1.0 and 2.0.

The signal transmitter is preferably a permanent magnet which has exactly two poles and is linearly polarized, so that simple and inexpensive magnets may be used.

To extend the measuring range, a plurality of separate Hall sensors may be arranged in series along the axis of movement which sense the signal transmitter one after the other. For example, three to five, in particular identical Hall sensors may be provided one behind the other in a straight line, with the axis of movement for all Hall sensors having an identical offset with respect to the imaginary centerline of the measurement zone.

The Hall sensor is in particular received in a control head of the valve, into which the valve tappet extends with the signal transmitter attached thereto.

The control head exclusively comprises, for example, sections of the valve through which there is no fluid flow of the process medium.

The control head e.g. has a fastening structure for a circuit board on which the Hall sensor is mounted. In addition, the control head usually has a passage for the valve tappet on a side facing a valve element of the valve. The fastening structure and the passage specify the position of the axis of movement with respect to the Hall sensor by their positions, which simplifies the precise mounting of the Hall sensor.

The valve element is in contact with areas of the valve through which fluid flows and closes or releases a valve seat, for example, the valve element being connected in a clear mechanical relationship to the valve tappet and thus to the signal transmitter, so that a determination of the position of the signal transmitter provides clear information about the position of the valve element.

The valve is, for example, a process valve, the invention can however also be implemented in all other suitable valves.

To process the signals from the Hall sensor, the position sensing means preferably comprises a control and/or evaluation unit which is connected to the Hall sensor in a signal-transmitting manner. This control and/or evaluation unit may, for example, be arranged on the same circuit board as the Hall sensor. However, it is also possible to process the signals externally and thus to arrange the control and/or evaluation unit elsewhere on the valve or outside the valve.

DETAILED DESCRIPTION

Figure 1:
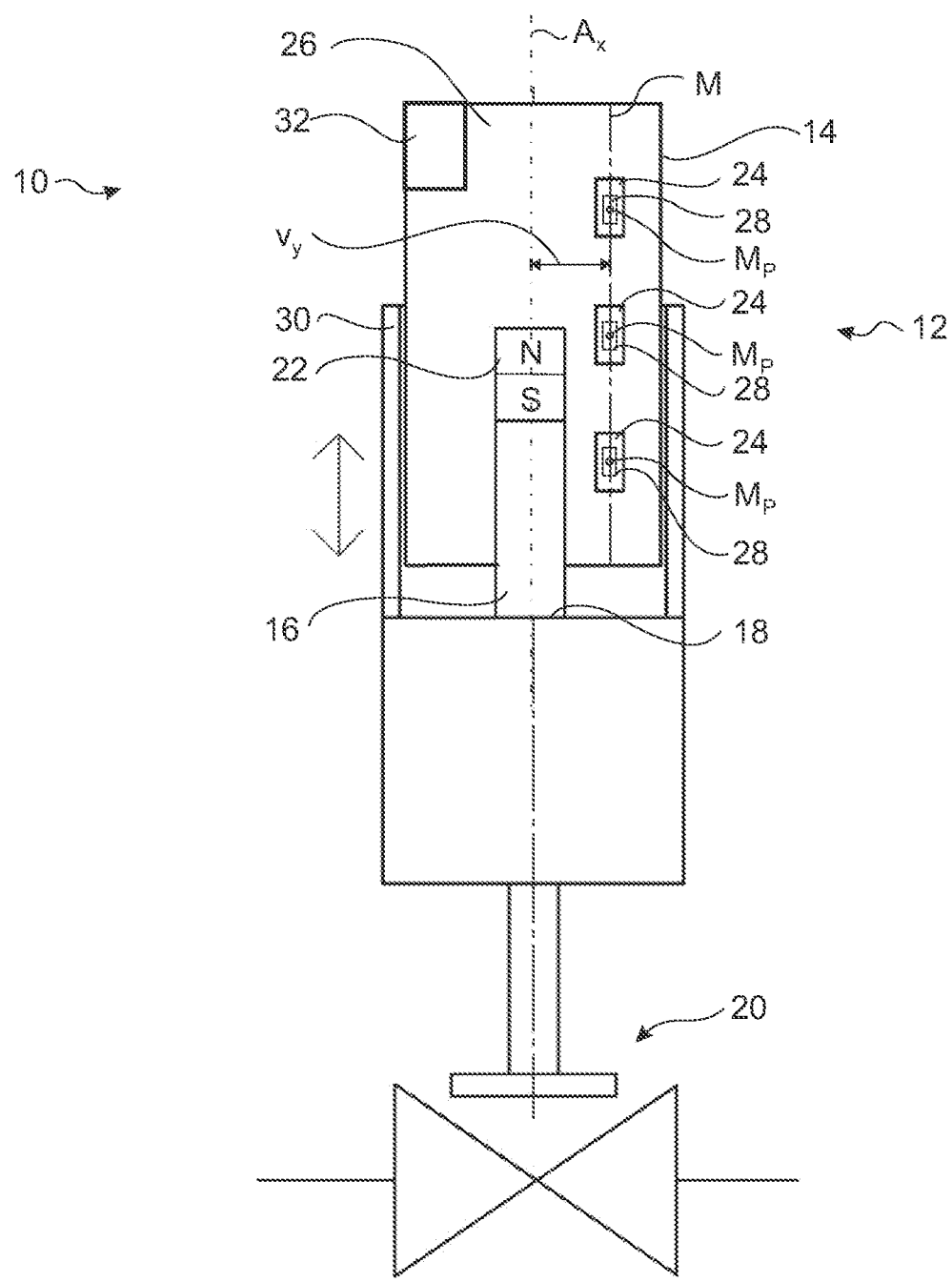
FIG. 1 shows a schematic representation of a valve according to the invention.

FIG. 1 shows a valve 10, here a process valve, with a schematically illustrated position sensing means 12, which is received in a control head 14 of the valve 10.

The control head 14 comprises here exclusively components of the valve 10 through which no process medium flows.

A valve tappet 16 projects through a passage 18 at the lower end of the control head 14 and is firmly connected to a valve element 20 outside the control head 14.

The valve element 20 interacts with process media carrying components of the valve 10, which are only outlined herein. For example, the valve element 20 may close or release a valve seat or interact with a component which closes or releases the valve seat. In any case, the movement of the valve tappet 16 is transmitted immediately and directly to the valve element 20, so that a position of the valve tappet 16 provides clear information about the position of the valve element 20.

A signal transmitter 22 is arranged on the valve tappet 16 at the end opposite the valve element 20. The signal transmitter 22 is an axially polarized magnet the poles of which are arranged along the longitudinal axis of the valve tappet 16. The arrangement of the poles shown in FIG. 1 is selected by way of example, the signal transmitter 22 may, of course, also have the opposite polarity.

The longitudinal axis of the valve tappet 16 defines an axis of movement $A_x$, the valve tappet 16 reciprocating linearly along the axis of movement $A_x$ within a predetermined range of movement to move the valve element 20.

The signal transmitter 22 is arranged fixed in position on the valve tappet 16 and generates a magnetic field rotationally symmetrical about the axis of movement $A_x$. Only a single signal transmitter 22 is provided in the valve 10 here.

The signal transmitter 22 is part of the position sensing means 12. The position sensing means 12 also includes one or more (here three) Hall sensors 24. In this example, all Hall sensors 24 are mounted together on a circuit board 26. All of the Hall sensors 24 are lined up along a straight line.

Each of the Hall sensors 24 includes a measurement zone 28 which is smaller than the housing dimensions of the Hall sensor 24.

In this example, all of the Hall sensors 24 are configured so as to be adapted to sense measurement signals in three spatial directions, x, y, z which are perpendicular to each other. Here, the x and y directions are considered to be a first and a second measuring direction, which are located in the area of the measurement zone 28 and which are thus arranged on the largest face of the substantially cuboid Hall sensor 24. The first and second measuring directions x, y are here also parallel to the surface of the circuit board 26. The third measuring direction thus extends in the z direction into the depth of the Hall sensor 24 perpendicular to the measurement zone 28. This measurement direction is not relevant to the method described herein, but the signal provided by this partial sensor may also be evaluated to obtain further information.

The invention can of course also be implemented with Hall sensors which include only partial sensors for the first and second measuring directions x, y, but not for the z direction.

The drawings are not to scale.

A fastening structure 30 to which the circuit board 26 is fixedly mounted is formed inside the control head 14.

Due to the fastening structure 30 and the passage 18, the position of the valve tappet 16 and the Hall sensors 24 inside the control head 14 are fixed, and thus also the relative positions of the signal transmitter 22 to the Hall sensors 24.

Figure 2:
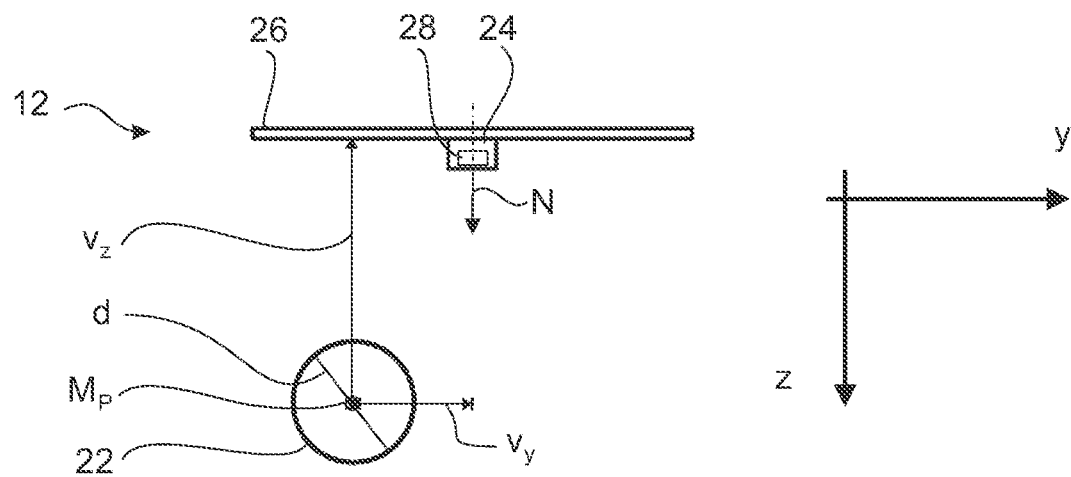
FIG. 2 schematically shows the positioning of a signal transmitter relative to a Hall sensor of the position sensing means of the valve from FIG. 1 in the y-z plane.
Figure 3:
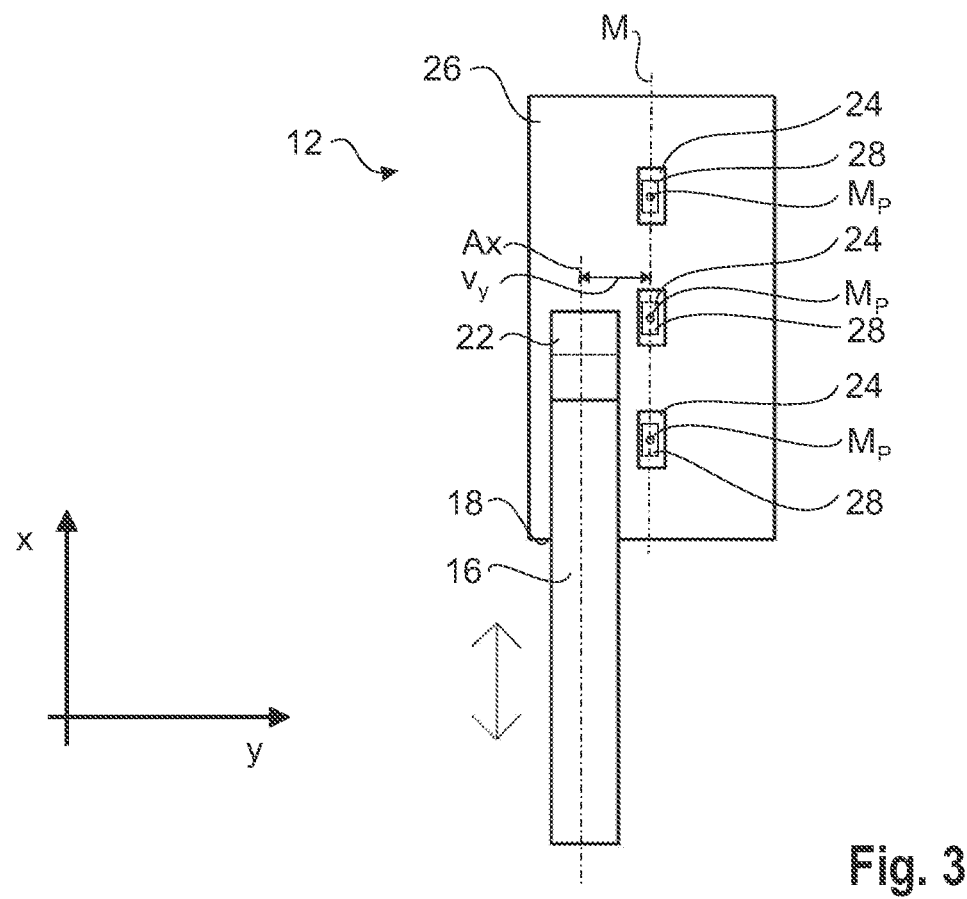
FIG. 3 schematically shows the positioning of the signal transmitter relative to the Hall sensor in the x-y plane.
Figure 4:
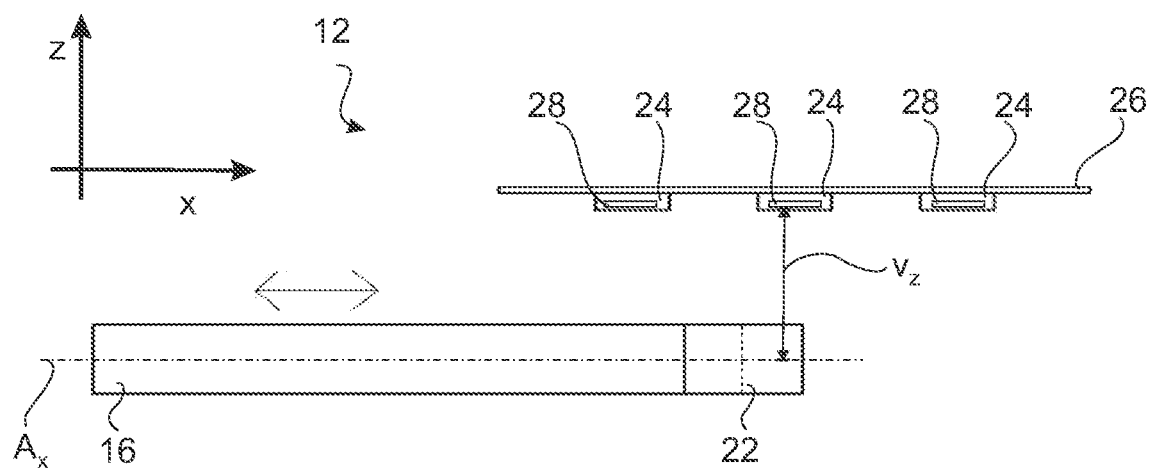
FIG. 4 schematically shows the positioning of the signal transmitter relative to the Hall sensor in the x-z plane.

The axis of movement $A_x$ is aligned along the first measuring direction x and is arranged with an offset $v_y$ and $v_z$ relative to the Hall sensors 24, more precisely relative to an imaginary centerline M of the measurement zone 28 of each of the Hall sensors 24 with respect to the y direction (see also FIGS. 2 to 4).

The imaginary centerline M passes through a center $M_P$ of each measurement zone 28 and along the first measuring direction x. The z direction coincides with a surface normal N of the measurement zone 28 (see also FIG. 2).

As shown in FIG. 2, the offset $v_y$ creates a distance between the axis of movement $A_x$ and the imaginary centerline M along the second measuring direction y, while the offset $v_z$ creates a distance between the axis of movement $A_x$ and the measurement zone 28 in the z direction.

Optionally, the offset $v_y$ is selected so large that in a projection along the surface normal N, the signal transmitter 22 does not overlap with the measurement zone 28, as shown in FIGS. 1 to 3. In any case, however, the axis of movement $A_x$ is positioned such that a surface normal N extending from the imaginary centerline M of the measurement zone 28 does not intersect the axis of movement $A_x$.

The signal transmitter 22 is an axially polarized permanent magnet having exactly one north and one south pole. The diameter d perpendicular to the axis of movement $A_x$ is, for example, 19 mm. The height along the axis of movement $A_x$ is chosen here to be 5 mm.

In this example, the measurement zone 28 of the Hall sensor 24 has a width of 1 mm along the y direction.

The offset $v_y$ is 5 to 8 mm here.

In general, the offset $v_y$ may be, for example, a factor of 0.3 to 0.5 of the diameter d of the signal transmitter 22.

The position sensing means 12 further comprises a control and/or evaluation unit 32 (see FIG. 1), which is connected to the Hall sensors 24 in a signal-transmitting manner and which is also arranged on the circuit board 26 here.

If the valve tappet 16 is moved along the axis of movement $A_x$, the signal transmitter 22 moves by the same amount as the valve element 20. As the signal transmitter 22 moves relative to the Hall sensors 24, the measurement signal generated by the Hall sensors 24 changes.

The control and/or evaluation unit 32 registers, in a known manner not explained in more detail here, which of the Hall sensors 24 is currently closest to the signal transmitter 22 and is thus currently responsible for sensing.

Figure 5:
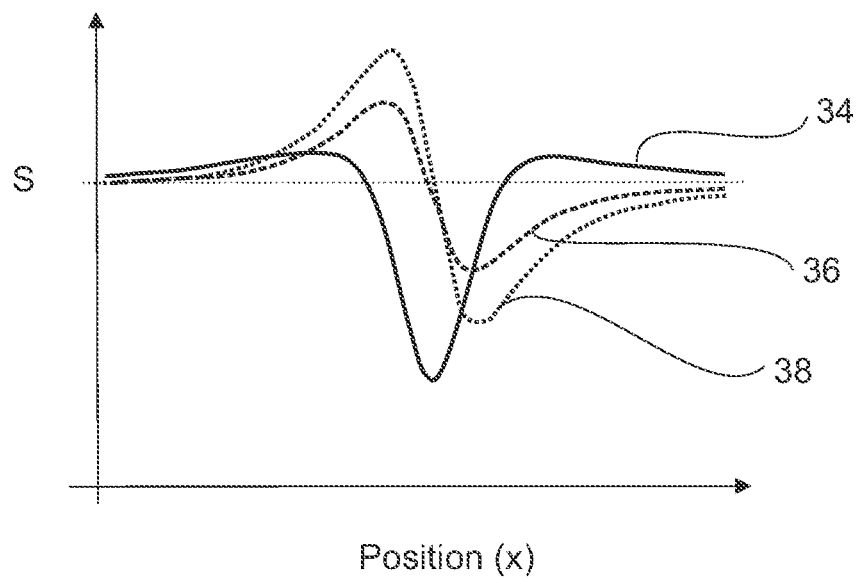
FIG. 5 shows a schematic representation of the measurement signals of the partial sensors of the Hall sensor sensed in the position sensing means of the valve from FIG. 1.

The moving magnetic field of the signal transmitter 22 generates in the partial sensor of the Hall sensor 24 responsible for the first measuring direction x a measurement signal 34 which increases and decreases again substantially continuously in terms of magnitude, as shown in FIG. 5.

For the second measuring direction y, magnetic field components are sensed in the y direction due to the offset $v_y$, which change polarity in the course of the passage of the signal transmitter 22 along the Hall sensor 24. Accordingly, a measurement signal 36 is obtained which has both a positive and a negative peak (see FIG. 5). The course of the measurement curves depends of course on the polarity of the signal transmitter 22.

The measurement signal 38 of the z partial sensor is not taken into account here.

The position of the axis of movement $A_x$ with respect to the measurement zone 28, i.e. the magnitude of the offset $v_y$, $v_z$, is to be selected at the discretion of a person skilled in the art such that the amplitude S of the measurement signal 36 received for the second measuring direction y is of the same order of magnitude as the amplitude S of the measurement signal 34 received for the first measuring direction x.

Optionally, the maximum signal strengths (measured from zero line-to-peak or peak-to-peak) of the measurement signals 34, 36 for the first and second measuring directions x, y have a ratio of 1.0 to 2.0.

When evaluating the measurement signals 34, 36, a quotient is formed from the sensed measurement signals 34, 36 for the first measuring direction x and the second measuring direction y, and this result is fed to a sigmoid function, for example an arctangent function, to obtain the length signal, from which a curve with an approximately straight-line rising section results in a known way, which has a direct dependence on the movement of the signal transmitter 22 and thus permits a simple determination of the position of the signal transmitter 22 and the valve element 20 (not shown here).

The length of this approximately linear section between two inflection points of the curve specifies the usable measuring range. In general, the dependency applies here that a higher offset $v_y$ leads to a larger usable measuring range, but if a value for the offset $v_y$ specified by the current system is exceeded, the amplitude S of the signal of the second measuring direction y is reduced as the offset $v_y$ increases. In this parameter range, a skilled person must select the suitable position of the movement axis $A_x$ for the specific system.

The invention claimed is:

1. A valve having a position sensing means comprising at least one Hall sensor and a signal transmitter, wherein the Hall sensor is structured so as to comprise at least two partial sensors which sense magnetic field components in a first measuring direction and in a second measuring direction orthogonal thereto, wherein the two measuring directions lie in a plane of a measurement zone of the Hall sensor, wherein the Hall sensor extends farther in the two measuring directions than the Hall sensor extends perpendicular thereto, and wherein the signal transmitter is an axially polarized magnet, generating a magnetic field rotationally symmetrical about an axis of movement, which is arranged on a valve tappet linearly displaceable along the axis of movement such that poles thereof lie in the axis of movement, wherein the axis of movement runs parallel to the first measuring direction and at a distance from the measurement zone along a surface normal of the measurement zone, wherein an imaginary centerline is defined on the measurement zone through a center of the measurement zone and along the first measuring direction, wherein the axis of movement is arranged at a distance from the imaginary centerline along the second measuring direction, wherein the plane of the measuring zone does not intersect the signal transmitter, and wherein an offset of the axis of movement with respect to the imaginary centerline along the second measuring direction is a factor of 0.3 to 0.5 of a diameter of the signal transmitter perpendicular to the axis of movement.

2. The valve according to claim 1, wherein an offset of the axis of movement relative to the imaginary centerline along the second measuring direction is so large that in a projection along the surface normal of the measurement zone, the signal transmitter does not overlap with the measurement zone.

3. The valve according to claim 1, wherein the signal transmitter is a permanent magnet having exactly two poles.

4. The valve according to claim 1, wherein a plurality of separate Hall sensors is arranged along the axis of movement.

5. The valve according to claim 1, wherein the Hall sensor is received in a control head of the valve, into which the valve tappet extends with the signal transmitter attached thereto.

6. The valve according to claim 5, wherein the control head comprises a fastening structure for a circuit board on which the Hall sensor is mounted, and a passage for the valve tappet on a side facing a valve element, wherein positions of the fastening structure and the passage at least partially define the position of the axis of movement.

7. The valve according to claim 1, wherein the valve is a process valve.

8. The valve according to claim 1, wherein the position sensing means comprises a control and/or evaluation unit which is connected to the Hall sensor in a signal-transmitting manner.

9. The valve according to claim 1, wherein the offset from the imaginary centerline is between 5 mm and 8 mm.

10. A valve having a position sensing means comprising at least one Hall sensor and a signal transmitter, wherein the Hall sensor is structured so as to comprise at least two partial sensors which sense magnetic field components in a first measuring direction and in a second measuring direction orthogonal thereto, wherein the two measuring directions lie in a plane of measurement zone of the Hall sensor, wherein the Hall sensor extends farther in the two measuring directions than the Hall sensor extends perpendicular thereto, and wherein the signal transmitter is an axially polarized magnet, generating a magnetic field rotationally symmetrical about an axis of movement, which is arranged on a valve tappet linearly displaceable along the axis of movement such that poles thereof lie in the axis of movement, wherein the axis of movement runs parallel to the first measuring direction and at a distance from the measurement zone along a surface normal of the measurement zone, wherein an imaginary centerline is defined on the measurement zone through a center of the measurement zone and along the first measuring direction, and wherein the axis of movement is arranged at a distance from the imaginary centerline along the second measuring direction, wherein the plane of the measuring zone does not intersect the signal transmitter, and wherein a ratio of differences between minimum and maximum values for the measurement directions when the signal transmitter moves over an entire range of movement are between 1.0 and 2.0.

* * * * *